Dec. 28, 1926.
P. CATUCCI
1,612,178
FISHING LINE REEL
Filed March 1. 1926
2 Sheets-Sheet 1
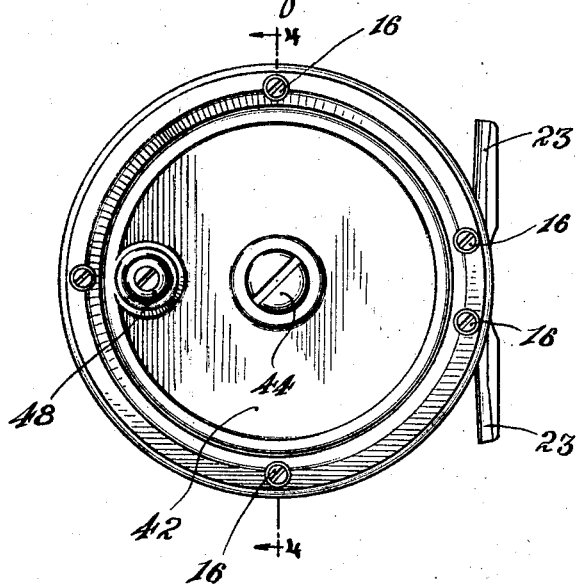
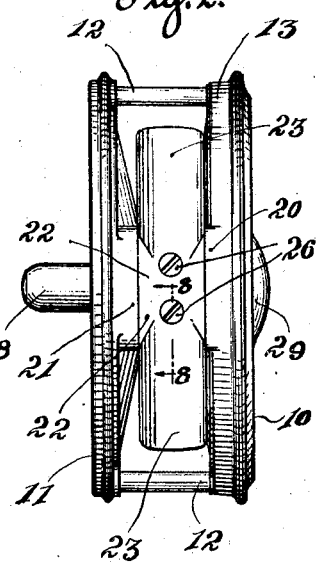
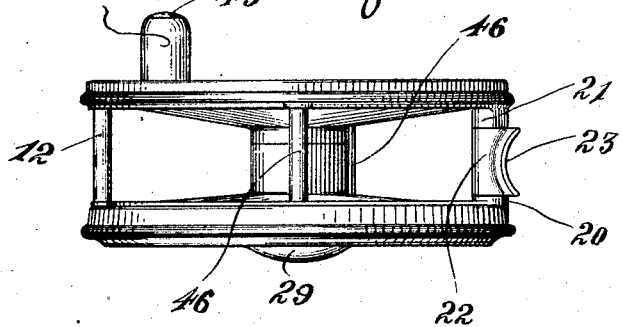
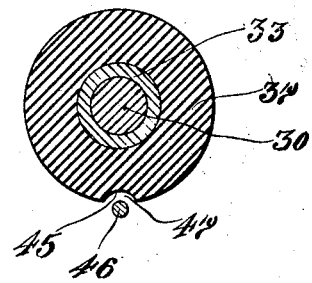
INVENTOR
Pliny Catucci
BY
Fredk C. Fischer
ATTORNEY Dec. 28, 1926.
P. CATUCCI
1,612,178
FISHING LINE REEL
Filed March 1, 1926   2 Sheets-Sheet 2
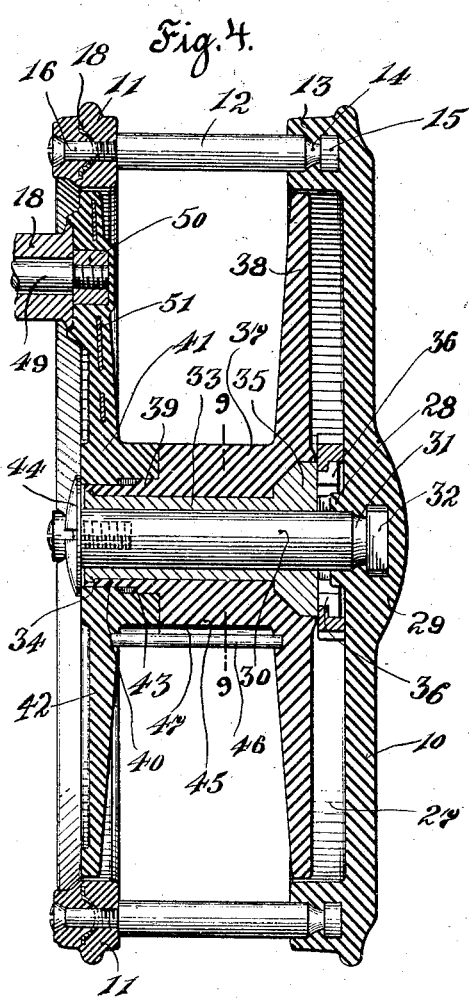
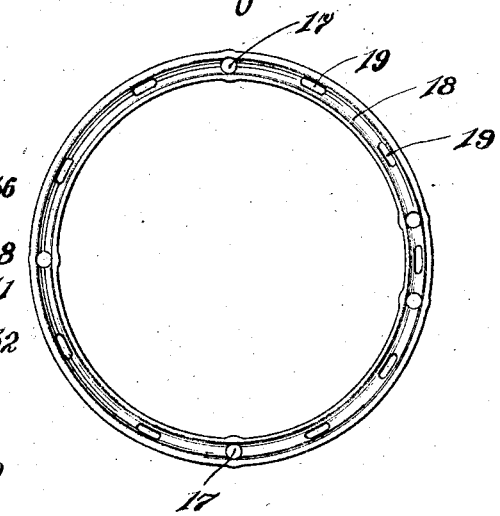
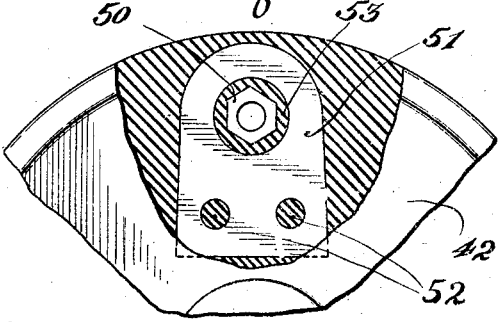
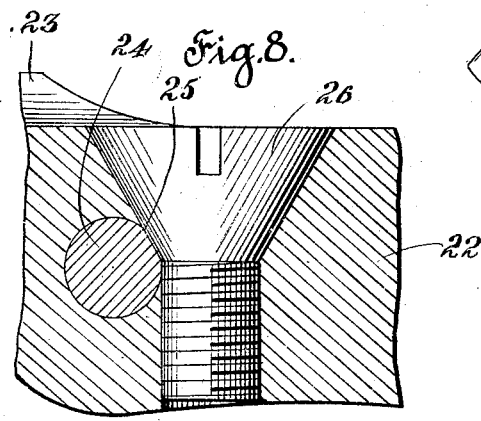
INVENTOR
Pliny Catucci
BY
Frank C Fischer
ATTORNEY Patented Dec. 28, 1926.

1,612,178

UNITED STATES PATENT OFFICE.

PLINY CATUCCI, OF NEWARK, NEW JERSEY.

FISHING-LINE REEL.

Application filed March 1, 1926. Serial No. 91,299.

This invention relates to fishing line reels and more particularly to simple types, known to the trade as trout reels, in which no multiplying gear train is used.

It is one of the objects of the invention to provide a reel, the frame and spool elements of which are constructed wholly by molding methods, from phenolic condensate products, requiring absolutely no machine or other finishing and presenting smoothly rounded surfaces on all edges throughout.

A further feature is in the provision of connecting posts for securing the frame sides in rigid relation, such posts being shaped at their embedded ends to be positively held fixedly in one frame member when molded.

Another aim is to provide metal reenforcements embedded in the members of the frame and spool flanges, at points where required to avoid fracture of the same and consequent destruction.

A still further purpose is in the provision of an adequate locking means whereby the support plate is effectually secured to the reel frame and the connecting members retained in their original integrity.

These and other analogous features are accomplished by the novel construction and combination of parts hereinafter described and illustrated in the accompanying drawings, constituting a material part of this disclosure, and in which:—

Figure 1 is a front elevational view of a fishing line reel made in accordance with the invention.

Figure 2 is a bottom plan view of the same.

Figure 3 is an edge view thereof taken in a plane at a right angle to that of Fig. 2.

Figure 4 is an enlarged transverse sectional view, taken substantially on line 4—4 of Fig. 1, showing the relation of parts.

Figure 5 is a plan view of a metal reenforcing ring set in the annular frame rim.

Figure 6 is a fragmentary sectional view of the frame rim showing the ring embedded therein and drawn to an enlarged scale.

Figure 7 is a fragmentary side view of the spool flange, drawn to an increased scale and partially broken away to show the crank handle securing means and reenforcing plate embedded therein.

Figure 8 is a fragmentary sectional view showing the method of securing the support bracket to the frame posts, and drawn to a greatly increased scale.

Figure 9 is a transverse sectional view taken on line 9—9 of Fig. 4.

The reel frame is composed of two main parts, respectively a circular back plate 10 and front annulus 11 spaced by posts 12 embedded in the thickened rim 13 of the back plate.

These several posts 12 are formed with annular recesses 14 beyond which are terminals 15 flattened on two opposite sides to present key-like elements to prevent turning after the material, in plastic state, has been molded around them, while the grooves 14 prevent the posts from being pulled outwardly.

The opposite, outer ends of the posts are drilled and tapped to receive screws 16 passed through countersunk openings in the rim annulus 11 by which it is rigidly held against the ends of the posts.

The screws 16 also pass through openings 17 made in a grooved metal re-enforcing ring 18 completely embedded in the annulus 11 when molded, the ring also containing openings 19 to permit the plastic material to pass through and thus becomes solidly incorporated.

A lug 20 extends inwardly from the plate rim 13 and a similar but longer lug 21 directly opposite from the annulus 11, the space between the inner faces of these lugs being occupied by the thickened central body 22 of a support bracket, the same having extending wings 23 shaped concavely to engage a pole.

Passing through the lugs and bracket body are two spaced posts 24 similar to the posts 12, provided with notches 25 to engage the conical heads of clamping screws 26 threaded into the bracket body 22, this arrangement preventing any possible loosening of the posts and affording an additional security over the screws 16 at the ends of the posts, forming an effective locking means.

The back plate 10 contains within its rim 13 an annular chamber 27, into which projects a short hub 28, the outer side of the plate presenting an outwardly curved protuberance 29.

Fixed partially in the protuberance 29, to extend through the hub, is an axial spindle 30 having an annular recess 31 and a flattened portion 32 at its end, which like the posts 12 and 24 are firmly molded in the back plate 10.

Rotatable on the spindle 30 is a sleeve 33 having at its outer end an integral collar 34 and at its inner end a conical head 35 from which project a plurality of radial projections 36 operative in connection with a click mechanism not shown and which forms no part of the present invention.

The sleeve 33, including its collar and conical head, is molded into a hub 37 extending from a spool side 38, clear of and partially contained in the chamber 27, the inner surface of the spool side, at its periphery, registering with the inner side surface of the rim 13.

A shouldered stepped projection 39 on the hub 37 is continued into a further reduced extension 40, and mounted on the elements 39 and 40 is the hub 41 of the opposite spool side 42, the same being securely cemented to the hub elements 39 and 40, provision for which is made by the intermedial recess 43, it being understood that the hubs 37 and 41 are held in intimate contact.

A wide headed screw 44 is threaded into the end of the spindle 30, its head extending outward to cover the sleeve and hub ends as shown, holding the spool in operative position to turn freely on the spindle, the spool side 42 revolving within the annulus 11.

The hubs 37 and 41 contain a single narrow longitudinal groove 45 and set in molded opening arranged in register in the spool sides 38 and 42 is a rod 46, presenting a space 47 between it and the groove 45 to receive the end of a fishing line.

A crank handle 48 is freely mounted on a stud 49 engaging the spool side 42 at a point near its periphery, the inner end of the stud being fixed in a nut 50 molded into the spool as may be seen in Figs. 4 and 7.

In order to reenforce the spool side 42, adjacent the handle, a metal element such as a plate 51 is embedded therein when the side is molded, the plate having holes 52 to permit flow of material and also an opening 53 through which the nut 50 passes without making contact; similar effects may also be attained by the insertion of suitably shaped wires during the molding process.

Due to the method of construction employed there is nothing to fray the line when in use or to discolor it; weight is maintained at a minimum and its employment is unaffected by weather conditions.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:—

1. A fishing line reel comprising a molded frame composed of a back plate and an annulus rigidly connected therewith, a spindle fixed axially in said plate, a two part spool having interengaging hubs and including a cement receiving space, a sleeve fixed in said hubs, said sleeve being revoluble on said spindle, and means for confining the spool on said spindle.

2. A fishing line reel comprising a molded frame composed of a back plate and an annulus, posts having annular grooves and flattened sides beyond the grooves molded in said back plate, a metal ring of channel cross section containing perforations embedded in said annulus, screws passing through said annulus and certain of the perforations in said ring to engage the outer ends of said studs, a spindle fixed in said back plate, a two part spool rotatable on said spindle, means to cement the parts of said spool together, means to retain the spool on said spindle, and means for rotating said spool.

3. A fishing line reel comprising a molded frame composed of a back plate and an annulus, posts embedded at one end in said back plate, means on the embedded ends to prevent rotating, other means to prevent extraction, means to rigidly secure said annulus to said posts, a support bracket, lugs extending from said plate and annulus to receive said bracket therebetween, a pair of posts passed through said bracket from said plate, said posts being notched, and screws fixed in said bracket, said screws having conical heads to partially engage in the notches of said posts.

4. A fishing line reel comprising a pair of molded frame members, means for holding said members in rigid spaced relation, inreaching lugs on each member, a support bracket disposed between said lugs, a pair of studs fixed in one member to pass through the lug thereof and the body of said bracket, screws passing through the other frame member and its lug to engage in the ends of said studs, clamp screws fixed in said bracket transversely of said studs, and conical heads on said clamp screws to engage in notches in said studs.

5. A fishing line reel comprising a pair of molded frame members, means for holding said members in rigid spaced relation, inreaching lugs on each member, a support bracket disposed between said lugs, a pair of studs fixed in one member to pass through the lug thereof and the body of said bracket, screws passing through the other frame member and its lug to engage in the ends of said studs, and means adjustable in said bracket to lock said studs rigidly therein.

6. In a fishing line reel, the combination with a frame having a rigid spindle, of a two part spool revoluble on said spindle, said spool having opposed flanges and jointed hubs therebetween, said hubs containing a single longitudinal recess, and a rod held at its ends in said flanges at a spaced distance from the mentioned recess.

7. In a fishing line reel, the combination with a frame having a rigid spindle, of a spool revoluble on said spindle, said spool having a recess extending beteween its flanges in its hub portion, and a rod fixed in the flanges over the recess to permit a line to enter the space between.

8. In a fishing line reel, the combination with a frame having a rigid spindle, of a molded spool revolubly mounted on said spindle, means to engage a line on the hub of said spool, a crank handle fixed on one flange of said spool, and a metal re-enforcement embedded in the flange supporting said crank handle.

9. In a fishing line reel, the combination with a frame having a rigid spindle, of a two part molded spool revoluble on said spindle, a nut molded into one flange of said spool, a metal re-enforcement wholly embedded in said flange to surround said nut, a stud engaged in said nut, and a crank handle revoluble on said stud.

This specification signed and witnessed this 27th day of February, 1926.

PLINY CATUCCI.